(12) United States Patent
Sarangi et al.

(10) Patent No.: US 9,144,885 B2
(45) Date of Patent: Sep. 29, 2015

(54) ABRASIVE ARTICLE FOR HIGH-SPEED GRINDING OPERATIONS

(75) Inventors: Nilanjan Sarangi, Shrewsbury, MA (US); Renaud Fix, Paris (FR); Stephen Woods, Stafford (GB); Jim M. Gaffney, Worcester, MA (US); John Campaniello, Oxford, MA (US); John R. Besse, Beacon Falls, CT (US); Stephen E. Fox, Worcester, MA (US)

(73) Assignees: SAINT-GOBAIN ABRASIVES, INC., Worcester, MA (US); SAINT-GOBAIN ABRASIFS (FR)

( * ) Notice: Subject to any disclaimer, the term of this patent is extended or adjusted under 35 U.S.C. 154(b) by 173 days.

(21) Appl. No.: 13/436,617

(22) Filed: Mar. 30, 2012

(65) Prior Publication Data

US 2012/0297692 A1 Nov. 29, 2012

Related U.S. Application Data

(60) Provisional application No. 61/470,060, filed on Mar. 31, 2011.

(51) Int. Cl.
| | |
|---|---|
| *B24D 3/00* | (2006.01) |
| *B24D 3/02* | (2006.01) |
| *B24D 11/00* | (2006.01) |
| *B24D 18/00* | (2006.01) |
| *C09K 3/14* | (2006.01) |
| *C09C 1/68* | (2006.01) |

(Continued)

(52) U.S. Cl.
CPC .. *B24D 3/00* (2013.01); *B24D 3/14* (2013.01); *C03C 3/091* (2013.01); *C03C 14/004* (2013.01); *C04B 35/1115* (2013.01); *C04B 35/6316* (2013.01); *C03C 2214/20* (2013.01); *C04B 2235/365* (2013.01); *C04B 2235/96* (2013.01)

(58) Field of Classification Search
USPC .................................. 51/298, 293, 307, 309
See application file for complete search history.

(56) References Cited

U.S. PATENT DOCUMENTS

| 4,224,380 A | 9/1980 | Bovenkerk et al. |
| 4,288,248 A | 9/1981 | Bovenkerk et al. |

(Continued)

FOREIGN PATENT DOCUMENTS

| JP | H06335866 A | 12/1994 |
| JP | 2001521829 A | 11/2001 |

(Continued)

OTHER PUBLICATIONS

International Search Report from PCT/US2012/031703, dated Oct. 23, 2012, 12 pgs.

(Continued)

*Primary Examiner* — James McDonough
(74) *Attorney, Agent, or Firm* — Abel Law Group, LLP; Joseph P. Sullivan

(57) ABSTRACT

An abrasive article can include a bonded abrasive body having abrasive particles comprising microcrystalline alumina (MCA) contained within a bond material. In an embodiment, the bonded abrasive body has a porosity of at least about 42 vol % of the total volume of the bonded abrasive body. Additionally, in an embodiment, the bonded abrasive body is capable of grinding a workpiece comprising metal at a speed of at least about 60 m/s at a material removal rate of at least about 0.4 in³/min/in (258 mm³/min/mm).

17 Claims, 6 Drawing Sheets

(51) Int. Cl.
  *B24D 3/14*   (2006.01)
  *C04B 35/111* (2006.01)
  *C04B 35/63*  (2006.01)
  *C03C 3/091*  (2006.01)
  *C03C 14/00*  (2006.01)

(56) References Cited

U.S. PATENT DOCUMENTS

| | | | |
|---|---|---|---|
| 4,314,827 A | | 2/1982 | Leitheiser et al. |
| 4,524,138 A | | 6/1985 | Schwetz et al. |
| 4,543,107 A | | 9/1985 | Rue |
| 4,623,364 A | | 11/1986 | Cottringer et al. |
| 4,744,802 A | | 5/1988 | Schwabel |
| 4,786,292 A | | 11/1988 | Janz et al. |
| 4,898,597 A | | 2/1990 | Hay et al. |
| 5,035,723 A | | 7/1991 | Kalinowski et al. |
| 5,053,723 A | * | 10/1991 | Schemmel ............ 331/14 |
| 5,090,970 A | | 2/1992 | Rue et al. |
| 5,094,672 A | | 3/1992 | Giles, Jr. et al. |
| 5,118,326 A | * | 6/1992 | Lee et al. ............ 51/309 |
| 5,129,919 A | | 7/1992 | Kalinowski et al. |
| 5,131,923 A | | 7/1992 | Markhoff-Matheny et al. |
| 5,152,810 A | * | 10/1992 | Rue et al. ............ 51/309 |
| 5,185,299 A | | 2/1993 | Wood et al. |
| 5,203,882 A | | 4/1993 | Carman et al. |
| 5,203,886 A | | 4/1993 | Sheldon et al. |
| 5,273,558 A | | 12/1993 | Nelson et al. |
| 5,401,284 A | | 3/1995 | Sheldon et al. |
| 5,536,283 A | | 7/1996 | Sheldon et al. |
| 5,863,308 A | | 1/1999 | Qi et al. |
| 6,066,189 A | * | 5/2000 | Meyer et al. ............ 51/298 |
| 6,074,278 A | | 6/2000 | Wu et al. |
| 6,086,648 A | | 7/2000 | Rossetti, Jr. et al. |
| 6,123,744 A | | 9/2000 | Huzinec |
| 6,500,220 B1 | | 12/2002 | Krueger et al. |
| 6,679,758 B2 | | 1/2004 | Bright et al. |
| 6,702,867 B2 | | 3/2004 | Carman et al. |
| 6,863,596 B2 | | 3/2005 | Fritz et al. |
| 6,887,288 B2 | | 5/2005 | Hokkirigawa et al. |
| 6,988,937 B2 | | 1/2006 | Bonner et al. |
| 7,077,723 B2 | | 7/2006 | Bright et al. |
| 7,275,980 B2 | | 10/2007 | Bonner et al. |
| 7,422,513 B2 | | 9/2008 | Bright et al. |
| 7,544,114 B2 | | 6/2009 | Orlhac |
| 7,722,691 B2 | | 5/2010 | Orlhac et al. |
| 2003/0205003 A1 | | 11/2003 | Carman et al. |
| 2006/0211342 A1 | | 9/2006 | Bonner et al. |
| 2007/0074456 A1 | | 4/2007 | Orlhac et al. |
| 2008/0066387 A1 | | 3/2008 | Bonner et al. |
| 2008/0085660 A1 | | 4/2008 | Orlhac |
| 2008/0222965 A1 | | 9/2008 | Querel et al. |
| 2008/0222967 A1 | | 9/2008 | Querel et al. |
| 2009/0068928 A1 | | 3/2009 | Kumar et al. |
| 2010/0190424 A1 | | 7/2010 | Francois et al. |
| 2010/0196700 A1 | | 8/2010 | Orlhac et al. |
| 2011/0083374 A1 | * | 4/2011 | Querel et al. ............ 51/308 |

FOREIGN PATENT DOCUMENTS

| | | |
|---|---|---|
| JP | 2004009195 A | 1/2004 |
| JP | 2004142085 A | 5/2004 |
| JP | 2005138285 A | 6/2005 |
| WO | 9922910 A1 | 5/1999 |
| WO | 0073022 A1 | 12/2000 |
| WO | 0170463 A2 | 9/2001 |
| WO | 0228980 A2 | 4/2002 |
| WO | 03086703 A1 | 10/2003 |
| WO | 2005097409 A | 10/2005 |
| WO | 2007040865 A1 | 4/2007 |
| WO | 2008079680 | 7/2008 |
| WO | 2008112899 A2 | 9/2008 |
| WO | 2008112914 A2 | 9/2008 |
| WO | 2009046091 A1 | 4/2009 |

OTHER PUBLICATIONS

International Search Report from PCT/US2012/031673, dated Oct. 10, 2012, 11 pgs.

* cited by examiner

ABRASIVE ARTICLE FOR HIGH-SPEED GRINDING OPERATIONS

PRIORITY CLAIM AND CROSS-REFERENCE TO RELATED APPLICATION

This application claims priority to U.S. Provisional Patent Application No. 61/470,060 filed on Mar. 31, 2011, and entitled "Abrasive Article for High-Speed Grinding Operations," and naming Nilanjan Sarangi as an inventor, which is incorporated by reference herein in its entirety.

BACKGROUND

1. Field of the Disclosure

The following is directed to abrasive articles, and particularly bonded abrasive articles suitable for conducting high-speed grinding operations.

2. Description of the Related Art

Abrasive tools are generally formed to have abrasive grains contained within a bond material for material removal applications. Superabrasive grains (e.g., diamond or cubic boron nitride (CBN)) or seeded (or even unseeded) sintered sol gel alumina abrasive grain, also referred to as microcrystalline alpha-alumina (MCA) abrasive grain, can be employed in such abrasive tools. The bond material can be organic materials, such as a resin, or an inorganic material, such as a glass or vitrified material. In particular, bonded abrasive tools using a vitrified bond material and containing MCA grains or superabrasive grains are commercially useful for grinding.

Certain bonded abrasive tools, particularly those utilizing a vitrified bond material, require high temperature forming processes, oftentimes on the order of 1100° C. or greater, which can have deleterious effects on abrasive grains of MCA. In fact, it has been recognized that at such elevated temperatures necessary to form the abrasive tool, the bond material can react with the abrasive grains, particularly MCA grains, and damage the integrity of the abrasives, reducing the grain sharpness and performance properties. As a result, the industry has migrated toward reducing the formation temperatures necessary to form the bond material in order to curb the high temperature degradation of the abrasive grains during the forming process.

For example, to reduce the amount of reaction between MCA grain and vitrified bond, U.S. Pat. No. 4,543,107 discloses a bond composition suitable for firing at a temperature as low as about 900° C. In an alternate approach, U.S. Pat. No. 4,898,597 discloses a bond composition comprising at least 40% fritted materials suitable for firing at a temperature as low as about 900° C. Other such bonded abrasive articles utilizing bond materials capable of forming at temperatures below 1000° C., include U.S. Pat. No. 5,203,886, U.S. Pat. No. 5,401,284, U.S. Pat. No. 5,536,283, and U.S. Pat. No. 6,702,867. Still, the industry continues to demand improved performance of such bonded abrasive articles.

The above vitreous bond materials are not necessarily suitable for high-speed grinding operations. Typically, high-speed grinding operations require vitreous bonded abrasive articles formed at sintering temperatures in excess of 1100° C., such that the abrasive article can withstand the forces applied during high-speed grinding operations. The industry continues to demand improved bonded abrasive articles.

SUMMARY

According to one aspect, an abrasive article includes a bonded abrasive body having abrasive particles comprising microcrystalline alumina (MCA) contained within a bond material formed from not greater than about 20 wt % boron oxide ($B_2O_3$), having a ratio of weight percent silica ($SiO_2$):weight percent alumina ($Al_2O_3$) of not greater than about 3.2 (by weight percent) and not greater than about 3.0 wt % phosphorous oxide ($P_2O_5$). The bonded abrasive body has a porosity of at least about 42 vol % of the total volume of the bonded abrasive body, and the bonded abrasive body is capable of grinding a workpiece comprising metal at a speed of at least about 60 m/s.

According to another aspect, an abrasive article has a bonded abrasive body having abrasive particles comprising microcrystalline alumina (MCA) contained within a single phase vitreous bond material formed from not greater than about 20 wt % boron oxide ($B_2O_3$), having a ratio of weight percent silica ($SiO_2$):weight percent alumina ($Al_2O_3$) of not greater than about 3.2 (by weight percent). The bonded abrasive body has a porosity of at least about 42 vol % of the total volume of the bonded abrasive body, and the bonded abrasive body is capable of grinding a workpiece comprising metal at a speed of at least about 60 m/s.

In yet another aspect, an abrasive article includes a bonded abrasive body having abrasive particles comprising microcrystalline alumina (MCA) contained within a bond material, wherein the bonded abrasive body has a porosity of at least about 42 vol % of the total volume of the bonded abrasive body. The bonded abrasive body is capable of grinding a workpiece comprising metal at a speed of at least about 60 m/s, and having a corner holding factor of not greater than about 0.07 inches (1.78 mm) at a depth of cut of 1.8.

In another aspect, an abrasive article includes a bonded abrasive body having abrasive particles comprising microcrystalline alumina (MCA) contained within a bond material, wherein the bonded abrasive body has a porosity of at least about 42 vol % of the total volume of the bonded abrasive body. The bonded abrasive body is capable of grinding a workpiece comprising metal at a speed of at least about 60 m/s, at a maximum power of not greater than about 10 Hp, and at a material removal rate of at least about 0.4 in³/min/in (258 mm³/min/mm).

According to yet another aspect, an abrasive article includes a bonded abrasive body having abrasive particles comprising microcrystalline alumina (MCA) contained within a bond material, wherein the bonded abrasive body has a porosity of at least about 42 vol % of the total volume of the bonded abrasive body. The bonded abrasive body is capable of grinding a workpiece comprising metal at a speed of at least about 60 m/s, at a depth of cut of at least about 0.003 inches (0.076 mm), and at a material removal rate of at least about 0.4 in³/min/in (258 mm³/min/mm).

In another aspect, an abrasive article includes a bonded abrasive body having abrasive particles comprising microcrystalline alumina (MCA) contained within a bond material, wherein the bonded abrasive body has a porosity of at least about 42 vol % of the total volume of the bonded abrasive body. The bonded abrasive body is capable of grinding a workpiece comprising metal at a speed of at least about 60 m/s at a material removal rate of at least about 0.4 in³/min/in (258 mm³/min/mm).

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
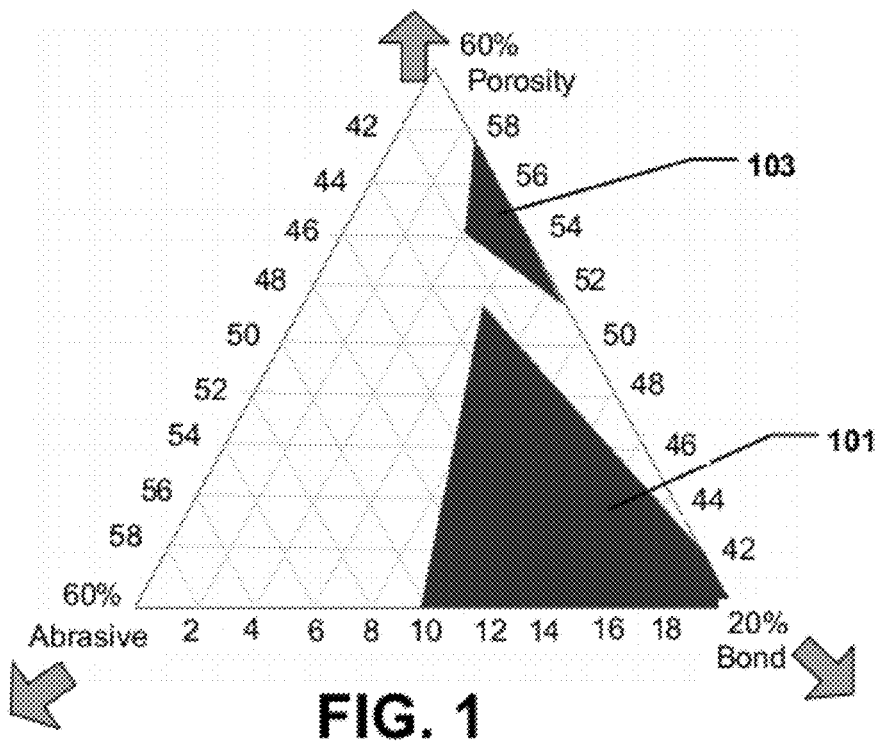
FIG. 1 includes a diagram of percent porosity, percent abrasive, and percent bond for prior art bonded abrasive bodies and bonded abrasive bodies according to embodiments herein.

The following is directed to bonded abrasive articles, which may be suitable for grinding and shaping of workpieces. Notably, the bonded abrasive articles of embodiments herein can incorporate abrasive particles within a vitreous bond material. Suitable applications for use of the bonded abrasive articles of the embodiments herein include grinding operations including for example, centerless grinding, cylindrical grinding, crankshaft grinding, various surface grinding operations, bearing and gear grinding operations, creepfeed grinding, and various toolroom applications.

According to an embodiment, the method of forming a bonded abrasive article of an embodiment can be initiated by forming a mixture of suitable compounds and components to form a bond material. The bond can be formed of compounds of inorganic material, such as oxide compounds. For example, one suitable oxide material can include silicon oxide ($SiO_2$). In accordance with an embodiment, the bond material can be formed from not greater than about 55 wt % silicon oxide for the total weight of the bond material. In other embodiments, the content of silicon oxide can be less, such as not greater than about 54 wt %, not greater than about 53 wt %, not greater than about 52 wt %, or even not greater than about 51 wt %. Still, in certain embodiments the bond material may be formed from at least about 45 wt %, such as at least about 46 wt %, on the order of at least about 47 wt %, at least about 48 wt %, or even at least about 49 wt % silicon oxide for the total weight of the bond material. It will be appreciated that the amount of silicon oxide can be within a range between any of the minimum and maximum percentages noted above.

The bond material can also incorporate a certain content of aluminum oxide ($Al_2O_3$). For example, the bond material can include at least about 12 wt % aluminum oxide for the total weight of the bond material. In other embodiments, the amount of aluminum oxide can be at least about 14 wt %, at least about 15 wt %, or even at least about 16 wt %. In certain instances, the bond material may include an amount of aluminum oxide that is not greater than about 23 wt %, not greater than about 21 wt %, not greater than about 20 wt %, not greater than about 19 wt %, or even not greater than about 18 wt % for the total weight of the bond. It will be appreciated that the amount of aluminum oxide can be within a range between any of the minimum and maximum percentages noted above.

In certain instances, the bond material can be formed from a particular ratio between the amount of silicon oxide as measured in weight percent versus the amount of aluminum oxide as measured in weight percent. For example, the ratio of silica to alumina can be described by dividing the weight percent of silicon oxide by the weight percent of aluminum oxide within the bond material. In accordance with an embodiment, the ratio of silicon oxide to aluminum oxide can be not greater than about 3.2. In other instances, the ratio of silicon oxide to aluminum oxide within the bond material can be not greater than about 3.1, not greater than about 3.0, or even not greater than about 2.9. Still, the bond material can be formed, in certain instances, such that the ratio of weight percent of silicon oxide to the weight percent of aluminum oxide is at least about 2.2, such as at least about 2.3, such as on the order of at least about 2.4, at least about 2.5, at least about 2.6, or even at least about 2.7. It will be appreciated that the total amount of aluminum oxide and silicon oxide can be within a range between any of the minimum and maximum values noted above.

In accordance with an embodiment, the bond material can be formed form a certain content of boron oxide ($B_2O_3$). For example, the bond material can incorporate not greater than about 20 wt % boron oxide for the total weight of the bond material. In other instances, the amount of boron oxide can be less, such as not greater than about 19 wt %, not greater than about 18 wt %, not greater than about 17 wt %, or even not greater than about 16 wt %. Still, the bond material can be formed from at least about 11 wt %, such as at least about 12 wt %, at least about 13 wt %, or even at least about 14 wt % boron oxide for the total weight of the bond material. It will be appreciated that the amount of boron oxide can be within a range between any of the minimum and maximum percentages noted above.

In accordance with one embodiment, the bond material can be formed such that the total content (i.e. sum) of the weight percent of boron oxide and weight percent of silicon oxide within the bond material can be not greater than about 70 wt % for the total weight of the bond material. In other instances, the total content of silicon oxide and boron oxide can be not greater than about 69 wt %, such as not greater than about 68 wt %, not greater than about 67 wt %, or even not greater than about 66 wt %. In accordance with one particular embodiment, the total weight percent content of silicon oxide and boron oxide can be at least about 55 wt %, such as at least about 58 wt %, at least about 60 wt %, at least about 62 wt %, at least about 63 wt %, at least about 64 wt %, or even at least about 65 wt % for the total weight of the bond material. It will be appreciated that the total weight percent of silicon oxide and boron oxide within the bond material can be within a range between any of the minimum and maximum percentages noted above.

Moreover, in particular instances, the amount of silicon oxide can be greater than the amount of boron oxide within the bond material, as measured in weight percent. Notably, the amount of silicon oxide can be at least about 1.5 times greater, at least about 1.7 times greater, at least about 1.8 times greater, at least about 1.9 times greater, at least about 2.0 times greater, or even at least about 2.5 times greater than the amount of boron oxide. Still, in one embodiment, the bond material can include an amount of silicon oxide that is not greater than about 5 times greater, such as not more than about 4 times greater, not more than about 3.8 times greater, or even not more than about 3.5 times greater. It will be appreciated that the difference in the amount of silicon oxide as compared to the amount of boron oxide can be within a range between any of the minimum and maximum values noted above.

In accordance with an embodiment, the bond material can be formed from at least one alkali oxide compound ($R_2O$), wherein R represents a metal selected from Group IA elements in the Periodic Table of Elements. For example, the bond material can be formed from an alkaline oxide compound ($R_2O$) from the group of compounds including lithium oxide ($Li_2O$), sodium oxide ($Na_2O$), potassium oxide ($K_2O$), and cesium oxide ($Cs_2O$), and a combination thereof.

In accordance with an embodiment, the bond material can be formed from a total content of alkali oxide compounds of not greater than about 20 wt % for the total weight of the bond material. For other bonded abrasive articles according to embodiments herein, the total content of alkali oxide compounds can be not greater than about 19 wt %, not greater than about 18 wt %, not greater than about 17 wt %, not greater than about 16 wt %, or even not greater than about 15 wt %. Still, in one embodiment, the total content of alkali oxide compounds within the bond material can be at least about 10 wt %, such as at least about 12 wt %, at least about 13 wt %, or even at least about 14 wt %. It will be appreciated that the bond material can include a total content of alkali oxide compounds within a range between any of the minimum and maximum percentages noted above.

In accordance with one particular embodiment, the bond material can be formed from not greater than about 3 individual alkali oxide compounds ($R_2O$) as noted above. In fact, certain bond materials may incorporate not greater than about 2 alkali oxide compounds within the bond material.

Furthermore, the bond material can be formed such that the individual content of any of the alkali oxide compounds is not greater than one half of the total content (in weight percent) of alkali oxide compounds within the bond material. Furthermore, in accordance with one particular embodiment, the amount of sodium oxide can be greater than the content (weight percent) of lithium oxide or potassium oxide. In more particular instances, the total content of sodium oxide as measured in weight percent can be greater than the sum of the contents of lithium oxide and potassium oxide as measured in weight percent. Furthermore, in one embodiment, the amount of lithium oxide can be greater than the content of potassium oxide.

In accordance with one embodiment, the total amount of alkali oxide compounds as measured in weight percent forming the bond material can be less than the amount (as measured in weight percent) of boron oxide within the bond material. In fact, in certain instances the total weight percent of alkali oxide compounds as compared to the total weight percent of boron oxide within the bond material can be within a range between about 0.9 to about 1.5, such as within a range between about 0.9 and about 1.3, or even within a range between about 0.9 and about 1.1.

The bond material can be formed from a certain amount of alkali earth compounds (RO), wherein R represents an element from Group IIA of the Periodic Table of Elements. For example, the bond material can incorporate alkaline earth oxide compounds such as calcium oxide (CaO), magnesium oxide (MgO), barium oxide (BaO), or even strontium oxide (SrO). In accordance with an embodiment, the bond material can contain not greater than about 3.0 wt % alkaline earth oxide compounds for the total weight of the bond material. In still other instances, the bond material may contain less alkaline earth oxide compounds, such as on the order of not greater than about 2.8 wt %, not greater than about 2.2 wt %, not greater than about 2.0 wt %, or not greater than about 1.8 wt %. Still, according to one embodiment, the bond material may contain a content of one or more alkaline earth oxide compounds of at least about 0.5 wt %, such as at least about 0.8 wt %, at least about 1.0 wt %, or even at least about 1.4 wt % for the total weight of the bond material. It will be appreciated that the amount of alkaline earth oxide compounds within the bond material can be within a range between any of the minimum and maximum percentages noted above.

In accordance with an embodiment, the bond material can be formed from not greater than about 3 different alkaline earth oxide compounds. In fact, the bond material may contain not greater than 2 different alkaline earth oxide compounds. In one particular instance, the bond material can be formed from 2 alkaline earth oxide compounds consisting of calcium oxide and magnesium oxide.

In one embodiment, the bond material can include an amount of calcium oxide that is greater than an amount of magnesium oxide. Furthermore, the amount of calcium oxide within the bond material may be greater than the content of any of the other alkaline earth oxide compounds present within the bond material.

The bond material can be formed from a combination of alkali oxide compounds and alkaline earth oxide compounds such that the total content is not greater than about 20 wt % for the total weight of the bond material. In other embodiments, the total content of alkali oxide compounds and alkaline earth oxide compounds within the bond material can be not greater than about 19 wt %, such as not greater than about 18 wt %, or even not greater than about 17 wt %. However, in certain embodiments, the total content of alkali oxide compounds and alkaline earth compounds present within the bond material can be at least about 12 wt %, such as at least about 13 wt %, such as at least about 14 wt %, at least about 15 wt %, or even at least about 16 wt %. It will be appreciated that the bond material can have a total content of alkali oxide compounds and alkaline earth oxide compounds within a range between any of the minimum and maximum percentages noted above.

In accordance with an embodiment, the bond material can be formed such that the content of alkali oxide compounds present within the bond material is greater than the total content of alkaline earth oxide compounds. In one particular embodiment, the bond material may be formed such that the ratio of total content (in weight percent) of alkali oxide compounds as compared to the total weight percent of alkaline earth oxide compounds ($R_2O:RO$) is within a range between about 5:1 and about 15:1. In other embodiments, the ratio of total weight percent of alkali oxide compounds to total weight percent of alkaline earth oxide compounds present within the bond material can be within a range between about 6:1 and about 14:1, such as within a range between about 7:1 and about 12:1, or even with a range between about 8:1 and about 10:1.

In accordance with an embodiment, the bond material can be formed from not greater than about 3 wt % phosphorous oxide for the total weight of the bond material. In certain other instances, the bond material may contain not greater than about 2.5 wt %, such as not greater than about 2.0 wt %, not greater than about 1.5 wt %, not greater than about 1.0 wt %, not greater than about 0.8 wt %, not greater than about 0.5 wt %, or even not greater than about 0.2 wt % phosphorous oxide for the total weight of the bond material. In fact, in certain instances, the bond material may be essentially free of phosphorous oxide. Suitable contents of phosphorous oxide can facilitate certain characteristics and grinding performance properties as described herein.

In accordance with one embodiment, the bond material can be formed from not greater than a composition comprising not greater than about 1 wt % of certain oxide compounds, including for example, oxide compounds such as $MnO_2$, $ZrSiO_2$, $CoAl_2O_4$, and MgO. In fact, in particular embodiments, the bond material can be essentially free of the above identified oxide compounds.

In addition to the bond materials placed within the mixture, the process of forming the bonded abrasive article can further include the incorporation of a certain type of abrasive particles. In accordance with an embodiment, the abrasive particles can include microcrystalline alumina (MCA). In fact, in certain instances, the abrasive particles can consist essentially of microcrystalline alumina.

The abrasive particles can have an average particle size that is not greater than about 1050 microns. In other embodiments, the average particle size of the abrasive particles can be less, such as on the order of not greater than about 800 microns, not greater than about 600 microns, not greater than about 400 microns, not greater than about 250 microns, not greater than about 225 microns, not greater than about 200 microns, not greater than about 175 microns, not greater than about 150 microns, or even not greater than about 100 microns. Still, the average particle size of the abrasive particles can be at least about 1 micron, such as at least about 5 microns, at least about 10 microns, at least about 20 microns, at least about 30 microns, or even at least about 50 microns, at least about 60 microns, at least about 70 microns, or even at least about 80 microns. It will be appreciated that the average particle size of the abrasive particles can be in a range between any of the minimum and maximum values noted above.

In further reference to abrasive particles utilizing microcrystalline alumina, it will be appreciated that microcrystalline alumina can be formed of grains having an average grain size that is sub-micron sized. In fact, the average grain size of a microcrystalline alumina can be not greater than about 1 micron, such as not greater than about 0.5 microns, not greater than about 0.2 microns, not greater than about 0.1 microns, not greater than about 0.08 microns, not greater than about 0.05 microns, or even not greater than about 0.02 microns.

Additionally, formation of the mixture, which includes abrasive particles and bond material, can further include the addition of other components, such as fillers, pore formers, and materials suitable for forming the finally-formed bonded abrasive article. Some suitable examples of pore forming materials can include but are not limited to bubble alumina, bubble mullite, hollow spheres including hollow glass spheres, hollow ceramic spheres, or hollow polymer spheres, polymer or plastic materials, organic compounds, fibrous materials including strands and/or fibers of glass, ceramic, or polymers. Other suitable pore forming materials can include naphthalene, PDB, shells, wood, and the like. In still another embodiment, the filler can include one or more inorganic materials, including for example oxides, and particularly may include crystalline or amorphous phases of zirconia, silica, titania, and a combination thereof.

After the mixture is suitably formed, the mixture can be shaped. Suitable shaping processes can include pressing operations and/or molding operations and a combination thereof. For example, in one embodiment, the mixture can be shaped by cold pressing the mixture within a mold to form a green body.

After suitably forming the green body, the green body can be sintered at a particular temperature to facilitate forming an abrasive article having a vitreous phase bond material. Notably, the sintering operation can be conducted at a sintering temperature that is less than about 1000° C. In particular embodiments, the sintering temperature can be less than about 980° C., such as less than about 950° C., and particularly within a range between about 800° C. and 950° C. It will be appreciated that particularly low sintering temperatures may be utilized with the above-noted bond components such that excessively high temperatures are avoided and thus limiting the degradation of the abrasive particles during the forming process.

According to one particular embodiment, the bonded abrasive body comprises a bond material having a vitreous phase material. In particular instances, the bond material can be a single phase vitreous material.

The finally-formed bonded abrasive body can have a particular content of bond material, abrasive particles, and porosity. Notably, the body of the bonded abrasive article can have a porosity of at least about 42 vol % for the total volume of the bonded abrasive body. In other embodiments, the amount of porosity can be greater such as at least about 43 vol %, such as at least about 44 vol %, at least about 45 vol %, at least about 46 vol %, at least about 48 vol %, or even at least about 50 vol % for the total volume of the bonded abrasive body. In accordance with an embodiment the bonded abrasive body can have a porosity that is not greater than about 70 vol %, such as not greater than about 65 vol %, not greater than about 62 vol %, not greater than about 60 vol %, not greater than about 56 vol %, not greater than about 52 vol %, or even not greater than about 50 vol %. It will be appreciated that the bonded abrasive body can have a porosity within a range between any of the minimum and maximum percentages noted above.

In accordance with an embodiment, the bonded abrasive body can have at least about 35 vol % abrasive particles for the total volume of the bonded abrasive body. In other embodiments, the total content of abrasive particles can be greater, such as at least about 37 vol %, or even at least about 39 vol %. In accordance with one particular embodiment, the bonded abrasive body can be formed such that it has not greater than about 50 vol % abrasive particles, such as not greater than about 48 vol %, or even not greater than about 46 vol % for the total volume of the bonded abrasive body. It will be appreciated that the content of abrasive particles within the bonded abrasive body can be within a range between any of the minimum and maximum percentages noted above.

In particular instances, the bonded abrasive body is formed such that it contains a minor content (vol %) of bond material as compared to the content of porosity and abrasive particles. For example, the bonded abrasive body can have not greater than about 15 vol % bond material for the total volume of the bonded abrasive body. In other instances, the bonded abrasive body can be formed such that it contains not greater than about 14 vol %, not greater than about 13 vol %, or even not greater than about 12 vol % for the total volume of the bonded abrasive body. In one particular instance, the bonded abrasive body can be formed such that it contains at least about 7 vol %, such as at least about 8 vol %, on the order of at least about 9 vol %, or even at least about 10 vol % bond material for the total volume of the bonded abrasive body.

FIG. 1 includes a diagram of phases present within a particular bonded abrasive article according to an embodiment. FIG. 1 includes vol % bond, vol % abrasive particles, and vol % porosity. The shaded region 101 represents a conventional bonded abrasive article suitable for high-speed grinding applications, while the shaded region 103 represents the phase contents of a bonded abrasive article according to an embodiment herein, which are also suitable for high-speed grinding applications. High-speed grinding applications are typically considered grinding conducted at operating speeds of 60 m/s or greater.

Notably, the phase content of the conventional high-speed bonded abrasive articles (i.e., shaded region 101) is significantly different from the phase content of a bonded abrasive article of an embodiment. Notably, conventional high-speed bonded abrasive articles typically have a maximum porosity within a range between approximately 40 vol % and 51 vol %, an abrasive particle content of approximately 42 vol % to 50 vol %, and a bond content of approximately 9 to 20 vol %. Conventional bonded abrasive articles typically have a maximum porosity content of 50 vol % or less because high-speed grinding applications require a bonded abrasive body having sufficient strength to deal with the excessive forces encountered during high-speed grinding, and highly porous bonded abrasive bodies have not previously been able to withstand said forces.

According to one embodiment, a bonded abrasive article can have a considerably greater porosity than the conventional high-speed bonded abrasive articles. For example, one bonded abrasive article of an embodiment can have a porosity content within a range between about 51 vol % and about 58 vol % for the total volume of the bonded abrasive body. Furthermore, as illustrated in FIG. 1, a bonded abrasive article of an embodiment can have an abrasive particle content within a range between about 40 vol % and about 42 vol %, and a particularly low bond content within a range between approximately 2 vol % and about 9 vol % for the total volume of the bonded abrasive article.

Notably, the bonded abrasive bodies of the embodiments herein can have particular characteristics unlike conventional bonded abrasive bodies. In particular, the bonded abrasive articles herein can have a particular content of porosity, abrasive particles, and bond, while demonstrating particular mechanical characteristics making them suitable for particular applications, such as high-speed grinding applications. For example, in one embodiment, the bonded abrasive body can have a particular modulus of rupture (MOR), which can correspond to a particular modulus of elasticity (MOE). For example, the bonded abrasive body can have a MOR of at least 45 MPa for a MOE of at least about 40 GPa. In one embodiment, the MOR can be at least about 46 MPa, such as at least about 47 MPa, at least about 48 MPa, at least about 49 MPa, or even at least about 50 MPa for a MOE of 40 GPa. Still, the bonded abrasive body may have an MOR that is not greater than about 70 MPa, such as not greater than about 65 MPa, or not greater than about 60 MPa for a MOE of 40 GPa. It will be appreciated that the MOR can be within a range between any of minimum and maximum values given above.

MOR can be measured using a standard 3 point bending test on a sample of size 4"×1"×0.5", where the load is applied across the 1"×0.5" plane, generally in accordance with ASTM D790, with the exception of the sample size. The failure load can be recorded and calculated back to MOR using standard equations. MOE can be calculated through measurement of natural frequency of the composites using a GrindoSonic instrument or similar equipment, as per standard practices in the abrasive grinding wheel industry.

In another embodiment, for certain bonded abrasive bodies having a MOE of 45 GPa, the MOR can be at least about 45 MPa. In fact, for certain bonded abrasive bodies having a MOE of 45 GPa, the MOR can be at least about 46 MPa, such as at least about 47 MPa, at least about 48 MPa, at least about 49 MPa, or even at least about 50 MPa. Still, the MOR may be not greater than about 70 MPa, not greater than about 65 MPa, or not greater than about 60 MPa for a MOE of 45 GPa. It will be appreciated that the MOR can be within a range between any of minimum and maximum values given above.

In one embodiment, the bonded abrasive body can have a strength ratio, which is a measure of the MOR divided by the MOE. In particular instances, the strength ratio (MOR/MOE) of a particular bonded abrasive body can be at least about 0.8. In other instances, the strength ratio can be at least about 0.9, such as at least about 1.0, at least about 1.05, at least about 1.10. Still, the strength ratio may be not greater than about 3.00, such as not greater than about 2.50, not greater than about 2.00, not greater than about 1.70, not greater than about 1.50, not greater than about 1.40, or not greater than about 1.30. It will be appreciated that the strength ratio of the bonded abrasive bodies can be within a range between any of the minimum and maximum values noted above.

In accordance with an embodiment, the bonded abrasive body can be suitable for use in particular grinding operations. For example, it has been discovered that the bonded abrasive bodies of embodiments herein are suitable in grinding operations requiring a high-speed of operation. In fact, the bonded abrasive bodies can be utilized at particularly high-speeds without damaging the workpiece and providing suitable or improved grinding performance. In accordance with an embodiment, the bonded abrasive body is capable of grinding a workpiece comprising metal at a speed of at least about 60 m/s. In other instances, the speed of operation of the bonded abrasive body can be greater, such as at least about 65 m/s, at least about 70 m/s, or even at least about 80 m/s. In certain instances, the bonded abrasive body may be capable of grinding a workpiece at speeds that are not greater than about 150 m/s, such as not greater than about 125 m/s. It will be appreciated that the bonded abrasive bodies of the present application can grind a workpiece at speeds of operation within a range between any of the minimum and maximum values noted above.

Reference herein to the grinding capabilities of the bonded abrasive body can relate to grinding operations such as centerless grinding, cylindrical grinding, crankshaft grinding, various surface grinding operations, bearing and gear grinding operations, creepfeed grinding, and various toolroom grinding processes. Moreover, suitable workpieces for the grinding operations can include inorganic or organic materials. In particular instances, the workpiece can include a metal, metal alloy, plastic, or natural material. In one embodiment, the workpiece can include a ferrous metal, non-ferrous metal, metal alloy, metal superalloy, and a combination thereof. In another embodiment, the workpiece can include an organic material, including for example, a polymer material. In still other instances, the workpiece may be a natural material, including for example, wood.

In particular instances, it has been noted that the bonded abrasive body is capable of grinding workpieces at a high-speed of operation and particularly high removal rates. For example, in one embodiment, the bonded abrasive body can conduct a grinding operation at a material removal rate of at least about 0.4 in$^3$/min/in (258 mm$^3$/min/mm). In other embodiments, the material removal rate can be at least about 0.45 in$^3$/min/in (290 mm$^3$/min/mm), such as at least about 0.5 in$^3$/min/in (322 mm$^3$/min/mm), at least about 0.55 in$^3$/min/in (354 mm$^3$/min/mm), or even at least about 0.6 in$^3$/min/in (387 mm$^3$/min/mm). Still, the material removal rate for certain bonded abrasive bodies may be not greater than about 1.5 in$^3$/min/in (967 mm$^3$/min/mm), such as not greater than about 1.2 in$^3$/min/in (774 mm$^3$/min/mm), not greater than about 1.0 in$^3$/min/in (645 mm$^3$/min/mm), or even not greater than about 0.9 in$^3$/min/in (580 mm$^3$/min/mm). It will be appreciated that the bonded abrasive bodies of the present application can grind a workpiece at the material removal rates within a range between any of the minimum and maximum values noted above.

During certain grinding operations, it has been noted that the bonded abrasive bodies of the present application can grind at high speeds at a particular depth of cut (DOC). For example, the depth of cut achieved by the bonded abrasive body can be at least about 0.003 inches (0.0762 millimeters). In other instances, the bonded abrasive body is capable of achieving a depth of cut during high-speed grinding operations of at least about 0.004 inches (0.102 millimeters), such as at least about 0.0045 inches (0.114 millimeters), at least about 0.005 inches (0.127 millimeters), or even at least about 0.006 inches (0.152 millimeters). It will be appreciated that the depth of cut for high-speed grinding operations utilizing the bonded abrasive bodies herein may not be greater than about 0.01 inches (0.254 millimeters), or not great than about 0.009 inches (0.229 millimeters). It will be appreciated that the depth of cut can be within a range between any of the minimum and maximum values noted above.

In other embodiments, it has been noted that the bonded abrasive body can grind a workpiece at a maximum power that does not exceed about 10 Hp (7.5 kW), while the grinding parameters noted above are utilized. In other embodiments, the maximum power during high-speed grinding operations may be not greater than about 9 Hp (6.8 kW), such as not greater than about 8 Hp (6.0 kW), or even not greater than about 7.5 Hp (5.6 kW).

In accordance with another embodiment, during high-speed grinding operations, it has been noted that the bonded abrasive articles of the embodiments herein have superior corner holding ability, particularly as compared to conventional high-speed bonded abrasive articles. In fact, the bonded abrasive body can have a corner holding factor of not greater than about 0.07 inches at a depth of cut (Zw) of at least about 1.8, which corresponds to 0.00255 inches/sec,rad. Notably, as used herein, a depth of cut of 1.0 correspond to 0.00142 inches/sec,rad, and a depth of cut (Zw) of 1.4 correspond to 0.00198 inches/sec,rad. It will be appreciated that the corner holding factor is a measure of a change in radius in inches after conducting 5 grinds on a workpiece of 4330V, which is a NiCrMoV hardened and tempered high strength steel alloy, at a particular depth of cut. In certain other embodiments, the bonded abrasive article demonstrates a corner holding factor that is not greater than about 0.06 inches, such as not greater than about 0.05 inches, not greater than about 0.04 inches, for a depth of cut of at least about 1.80.

EXAMPLES

Example 1

Figure 2:
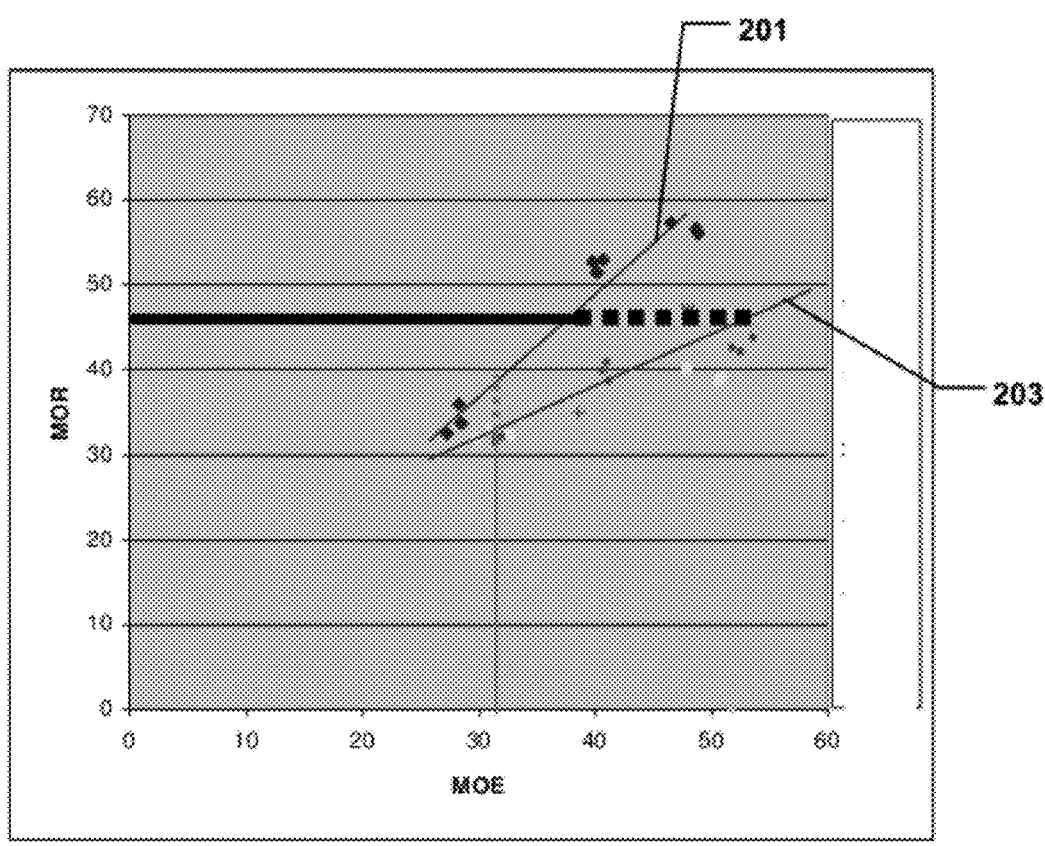
FIG. 2 includes a graph of MOR versus MOE for conventional bonded abrasive articles and bonded abrasive articles according to embodiments herein.

FIG. 2 includes a plot of Modulus of Rupture (MOR) versus Modulus of Elasticity (MOE) for bonded abrasive articles according to embodiments herein and conventional bonded abrasive articles. Plot 201 represents the MOR and MOE for a series of bonded abrasive articles formed according to the embodiments herein. Each of the samples of the series are made having a bond composition provided in Table 1 below (in wt %). The samples have a range of porosity of approximately 42 vol % to approximately 56 vol %, a range of abrasive particle content (i.e., microcrystalline alumina particles) within a range between about 42 vol % and about 52 vol %, and a range of bond material content within a range between about 6 vol % and about 14 vol %. Each of the samples are cold pressed to form bars and sintered at a sintering temperature of approximately 900 to 1250° C.

TABLE 1

| | |
|---|---|
| SiO2 | 48-52 |
| Al2O3 | 15-20 |
| Fe2O3 | Trace (<1.0%) |
| TiO2 | Trace |
| CaO | 1-1.5 |
| MgO | Trace |
| Li2O | 2-5 |
| Na2O | 5-10 |
| K2O | 2-5 |
| B2O3 | 10-17 |

Plot 203 represents MOR and MOE values of samples of conventional bonded abrasive articles suitable for high-speed grinding applications. The conventional samples represent bonded abrasive articles commercially available as K, L, and M grades in VS, VH, and VBE, vitreous bonded abrasive products by Saint-Gobain Corporation. The samples had a range of porosity of approximately 42 vol % to approximately 56 vol %, a range of abrasive particle content (i.e., microcrystalline alumina particles) within a range between about 42 vol % and about 2 vol %, and a range of bond material content within a range between about 6 vol % and about 14 vol %.

MOR and MOE testing was completed using the tests described above. Each of the samples were formed to a size of approximately 4"×1"×0.5", and MOR is measured using a standard 3 point bending test where the load is applied across the 1"×0.5" plane, generally in accordance with ASTM D790, with the exception of the sample size. The failure load is recorded and calculated back to MOR using standard equations. MOE is calculated through measurement of natural frequency of the composites using a GrindoSonic instrument.

As illustrated in FIG. 2, the samples representing the bonded abrasive articles of embodiments herein (i.e., plot 201) demonstrate higher MOR values for a given MOE value as compared to the samples representing the conventional bonded abrasive articles (i.e., plot 203). Samples representing the bonded abrasive articles of the embodiments herein have a strength ratio (slope of the line for plot 201: MOR/MOE) of approximately 1.17. The samples representing the conventional bonded abrasive articles have a strength ratio (slope of the line for plot 203: MOR/MOE) of approximately 0.63. The data of FIG. 2 demonstrates that samples representing the bonded abrasive bodies of the embodiments herein have improved MOR values for particular MOE values as compared to conventional bonded abrasive articles.

Accordingly, the bonded abrasive articles of the embodiments herein are suitable for high-speed grinding operations as demonstrated by the higher MOR values for particular MOE values as compared to conventional high-speed bonded abrasive articles. Furthermore, because the MOR is greater for a particular MOE in the samples representing the bonded abrasive articles of the embodiments herein, such features facilitate improved power consumption for the speed of operation as well as improved corner holding ability at an increased speed of operation.

Example 2

Figure 3:
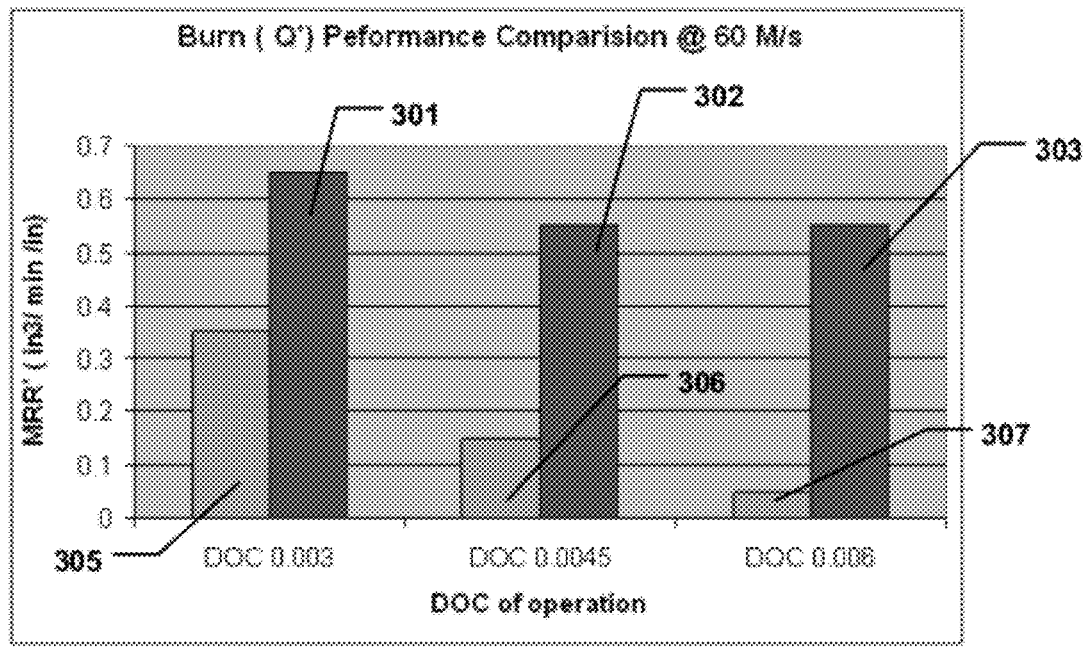
FIG. 3 includes a chart of material removal rate versus depth of cut for a conventional bonded abrasive article compared to a bonded abrasive article according to an embodiment herein.

Further comparative grinding studies were conducted to compare the high-speed grinding capabilities of the bonded abrasive articles of the embodiments herein to conventional high-speed grinding bonded abrasive articles. FIG. 3 includes a chart of material removal rate versus depth of cut for a conventional bonded abrasive article compared to a bonded abrasive article according to an embodiment herein. Three tests were conducted at various depths of cut (DOC) including 0.003 inches, 0.0045 inches, and 0.006 inches. The testing parameters are included in Table 3 below.

TABLE 3

| | |
|---|---|
| Dress the wheel | Dressing is performed at a dress ratio of 2. 10" wheel rotating at a speed of 1000 rpm (2616 F/min) and 4" profile dresser rotating at a speed of 5000 rpm (5233 F/min). Feed rate .005 in/min. for a plunge depth of .020" (.0075" removal on wall). |
| Select Q' (feedrate) for test | In the first part of the test the wheel's performance is measured by varying Q' or feed rate and finding the Q', within 0.5 in$^3$/min/in, at which the wheel displays "visual" burn for a 12" or 24" length of grind. The burn/no burn Q' threshold should be identified in about 3-5 grinds. |
| Load and pre grind 2 test pieces | 7. Using one side of the wheel with a 22 deg. angle on the side, pre-grind two 6" test pieces, in series, at a D.O.C of .006" for a 12 length of grind at a feed rate of 25 in./min. (Q' = .15). |
| Dress the wheel | Form dressing with diamond pre-form tool |
| Grind 2 test pieces of Stainless Steel 8620 for 1 or 2 passes (1 pass = 12" or 2 passes = 24") | Using one side of the wheel with a 22 deg. angle on the side, grind two 6" test pieces, in series, at a D.O.C of .006" for a 12 length of grind at a feed rate which represents the desired Q' for the test. |
| Inspect test pieces for visual burn | |
| Record maximum power | |
| Measure and record Ra, Wt, HRc, and check for signs of bar distortion or rocking | |
| Repeat test until max material removal, prior to visual observation of burn, is found to the nearest 0.05 Q' reported in in.$^3$/min./in. | |

| Q' | Feedrate |
|---|---|
| Q' = .15 | 25 in./min. |
| Q' = .30 | 50 in./min. |
| Q' = .35 | 58 in./min. |
| Q' = .40 | 67 in./min. |
| Q' = .45 | 75 in./min. |
| Q' = .50 | 83 in./min. |
| Q' = .55 | 92 in./min. |
| Q' = .60 | 100 in./min. |

For D.O.C. of .006"

Plots 301, 302, and 303 (301-303) represent samples of the bonded abrasive articles formed according to the embodiments herein. Each of the samples 301-303 had a range of porosity of approximately 52 vol % to approximately 56 vol %, a range of abrasive particle content (i.e., microcrystalline alumina particles) within a range between about 40 vol % and about 44 vol %, and a range of bond material content within a range between about 3 vol % and about 8 vol %. The composition of the bond is the same as that provided in Table 1 above.

Samples 305, 306, and 307 (305-307) represent conventional bonded abrasive articles suitable for high-speed grinding applications. The conventional samples 305-307 are bonded abrasive articles commercially available as NQM90J10VH Product from Saint-Gobain Corporation. Each of the samples 305-307 had a range of porosity of approximately 50 vol % to approximately 52 vol %, a range of abrasive particle content (i.e., microcrystalline alumina particles) within a range between about 42 vol % and about 44 vol %, and a range of bond material content within a range between about 6 vol % and about 10 vol %.

As illustrated in FIG. 3, samples 301-303 were capable of achieving significantly greater material removal rates at each of the tested depths of cut as compared to the conventional samples 305-307 for the high-speed grinding operation (i.e., conducted at 60 m/s operating speed). In each test, the samples 301-303 and 305-307 were used to grind until the workpiece exhibited burn or the sample failed to grind. In every test, the samples 301-303 achieved markedly greater material removal rates compared to the conventional samples 305-307. And, in fact, at a depth of cut of 0.0045 inches, the material removal rate of sample 302 was over 3× greater than that of the material removal rate achieved by the conventional sample 306. Furthermore, at the depth of cut value of 0.006 inches, sample 303 demonstrated a material removal rate comparable to the material removal rate of sample 302, and greater than 10× the material removal rate of the conventional sample 307. Such results show a remarkable improvement in the grinding efficiency and grinding capabilities of the bonded abrasive articles formed according to the embodiments herein over state-of-the-art conventional bonded abrasive articles.

Example 3

Figure 4:
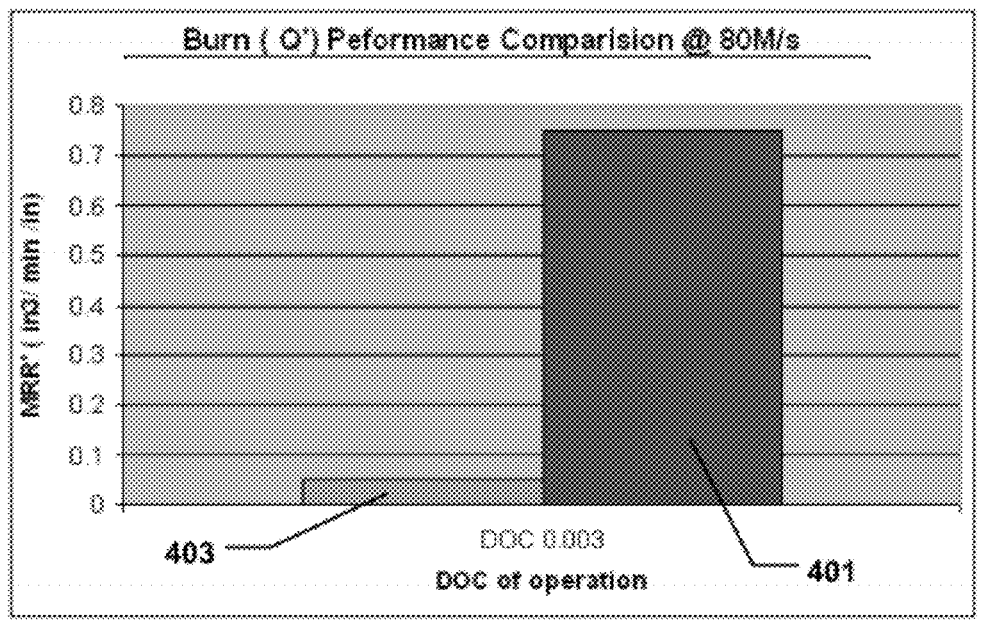
FIG. 4 includes a chart of material removal rate versus depth of cut for a conventional bonded abrasive article and a bonded abrasive article according to an embodiment.

Further comparative grinding studies are conducted to compare the high-speed grinding capabilities of the bonded abrasive articles of the embodiments herein to conventional high-speed grinding bonded abrasive articles. FIG. 4 includes a chart of material removal rate versus depth of cut for a conventional bonded abrasive article and a bonded abrasive article according to an embodiment. The same test as presented in Example 2 (See, Table 3 above) is conducted at a particular depth of cut (DOC) of 0.003 inches to measure the threshold material removal rate before the workpiece exhibits burn. Note that for this test, the speed of operation is 80 m/s.

Plot 401 represents a sample of the bonded abrasive articles formed according to the embodiments herein. Sample 401 had a structure similar to the samples 301-303 presented in Example 3 above. Sample 403 represents a conventional bonded abrasive article suitable for high-speed grinding applications, commercially available as NQM90J10VH Product from Saint-Gobain Corporation.

As illustrated in FIG. 4, sample 401 achieved a significantly greater material removal rate as compared to the conventional sample 403. And, in fact, at a depth of cut of 0.003 inches, the material removal rate of sample 401 was over 10× greater than that of the material removal rate achieved by the conventional sample 403. Such results show a remarkable improvement in the grinding efficiency and grinding capabilities of the bonded abrasive articles formed according to the embodiments herein over state-of-the-art conventional bonded abrasive articles.

Example 4

Figure 5:
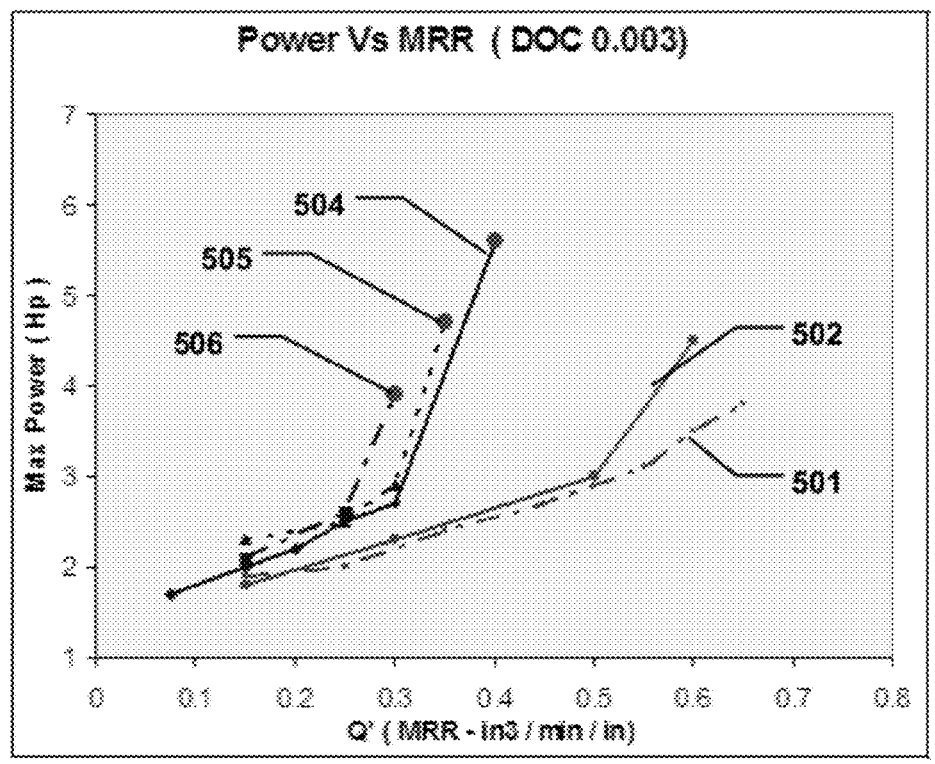
FIG. 5 includes a plot of maximum power versus material removal rate for conventional bonded abrasive articles and bonded abrasive articles according to embodiments herein.
Figure 6:
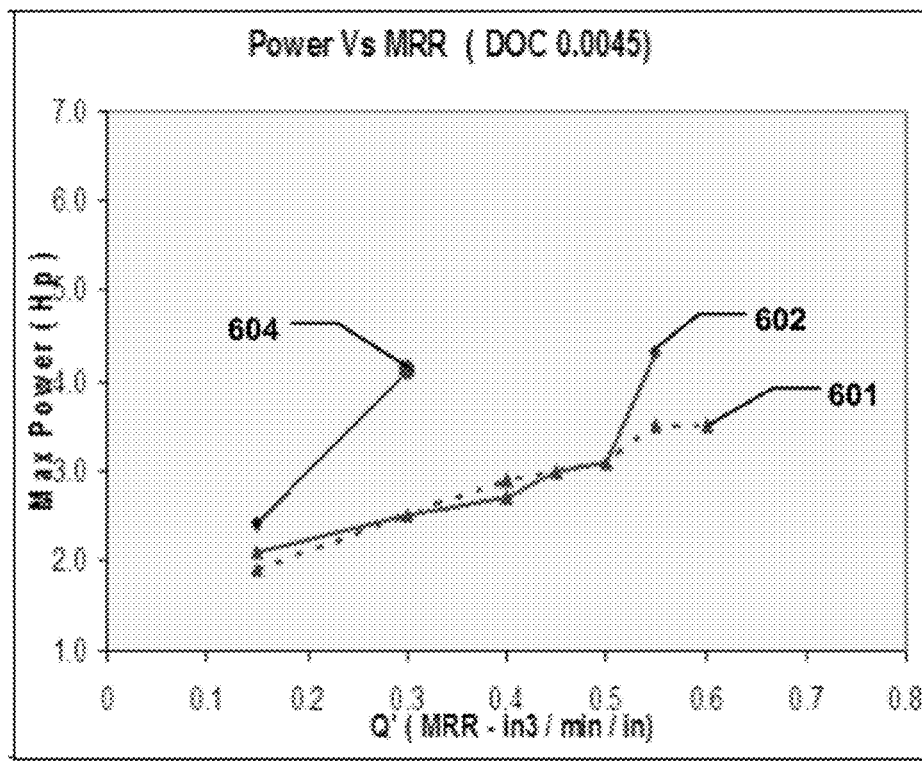
FIG. 6 includes a plot of maximum power versus material removal rate for conventional bonded abrasive articles and bonded abrasive articles according to embodiments.
Figure 7:
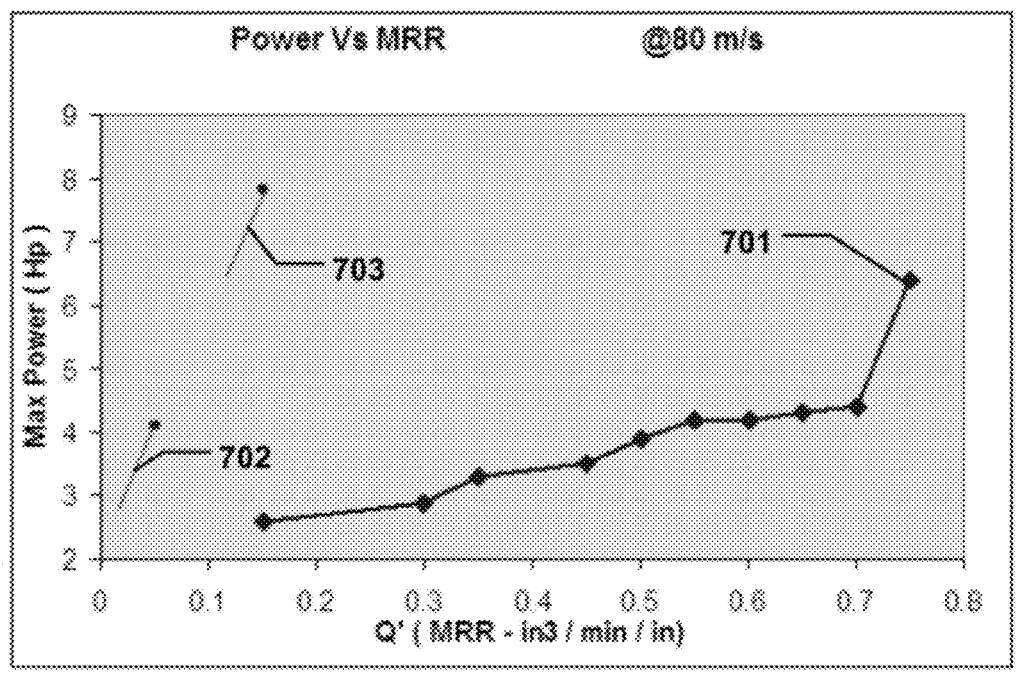
FIG. 7 includes a plot of maximum power versus material removal rate for conventional bonded abrasive articles and bonded abrasive articles according to an embodiment.

Another comparative grinding test is conducted to compare the maximum power consumption during high-speed grinding operations for bonded abrasive articles of the embodiments herein and conventional high-speed grinding bonded abrasive articles. FIGS. 5-7 include plots illustrating the test results.

FIG. 5 includes a plot of maximum power versus material removal rate for conventional bonded abrasive articles and bonded abrasive articles according to embodiments herein. A test was conducted on various samples at a depth of cut (DOC) of 0.003 inches and a speed of operation of 60 m/s, using the same parameters as provided in Table 3 above. For the test, all samples 501-502 and 504-506 were used to grind the workpiece until the workpiece exhibited burn or the sample failed to grind.

Plots 501 and 502 (501-502) represent samples of the bonded abrasive articles formed according to the embodiments herein. The samples 501-502 had a range of porosity of approximately 52 vol % to approximately 56 vol %, a range of abrasive particle content (i.e., microcrystalline alumina particles) within a range between about 40 vol % and about 44 vol %, and a range of bond material content within a range between about 3 vol % and about 8 vol %. The composition of the bond is the same as provided in Table 1 above.

Samples 504, 505, and 506 (504-506) represent conventional bonded abrasive articles suitable for high-speed grinding applications. The conventional samples 504-506 are bonded abrasive articles commercially available as NQM90J10VH Product from Saint-Gobain Corporation. Each of the samples 504-506 had a range of porosity of approximately 50 vol % to approximately 52 vol %, a range of abrasive particle content (i.e., microcrystalline alumina particles) within a range between about 42 vol % and about 44 vol %, and a range of bond material content within a range between about 6 vol % and about 10 vol %.

As illustrated in FIG. 5, samples 501-502 achieve significantly greater material removal rates at a depth of cut of 0.003 inches while having comparable or less maximum power consumption as compared to the conventional samples 504-506 for the high-speed grinding operation (i.e., conducted at 60 m/s operating speed). In every test, samples 501-502 achieved markedly greater material removal rates compared to the conventional samples 504-506. And, in fact, the maximum power consumption of sample 501 was significantly less than the maximum power consumption of the conventional samples 504 and 505, and comparable to the maximum power consumption of conventional sample 506. Likewise, the maximum power consumption of sample 502 was comparable to the maximum power consumption of the conventional samples 504 and 505, while achieving a material removal rate of nearly 2× the material removal rate of the conventional samples 504 and 505. Such results show a remarkable improvement in the grinding efficiency and grinding capabilities of the bonded abrasive articles formed according to the embodiments herein over state-of-the-art conventional bonded abrasive articles.

FIG. 6 includes a plot of maximum power versus material removal rate for conventional bonded abrasive articles and bonded abrasive articles according to embodiments herein. The test was conducted on various samples at a depth of cut (DOC) of 0.0045 inches and a speed of operation of 60 m/s, using the same parameters as provided in Table 3 above. For the test, all samples 601-602 and 604 were used to grind the workpiece until the workpiece exhibited burn or the sample failed to grind.

Plots 601 and 602 (601-602) represent samples of the bonded abrasive articles formed according to the embodiments herein. Samples 601 and 602 have the same structure as samples 501 and 502 noted above. Sample 604 represents a conventional bonded abrasive article suitable for high-speed grinding applications. The conventional sample 604 is a bonded abrasive article the same as the commercially available bonded abrasive product 504 described above.

As illustrated in FIG. 6, samples 601-602 achieve significantly greater material removal rates at a depth of cut of 0.0045 inches while having similar or less maximum power consumption as compared to the conventional sample 604. In fact, the maximum power consumption of sample 601 was comparable to the maximum power consumption of the conventional sample 604, while the material removal rate of sample 601 was nearly 2× greater than the material removal rate of sample 604. Furthermore, the maximum power consumption of sample 602 was less than the maximum power consumption of the conventional sample 604, and demonstrated a material removal rate of 2× the material removal rate of the conventional sample 604. Such results show a significant improvement in the grinding efficiency and grinding capabilities of the bonded abrasive articles formed according to the embodiments herein over state-of-the-art conventional bonded abrasive articles.

FIG. 7 includes a plot of maximum power versus material removal rate for conventional bonded abrasive articles and bonded abrasive articles according to an embodiment. A test was conducted on various samples at a depth of cut (DOC) of 0.003 inches and a speed of operation of 80 m/s, using the same parameters as provided in Table 3 above. For the test, all samples 701 and 702-703 were used to grind the workpiece until the workpiece exhibited burn or the sample failed to grind.

Plot 701 represents a sample of a bonded abrasive article formed according to an embodiment herein. Sample 701 has the same structure as sample 501 as noted above. Samples 702-703 represent conventional bonded abrasive articles suitable for high-speed grinding applications. The conventional samples 702-703 are bonded abrasive articles that are the same as the commercially available samples 504-506 as described above.

As illustrated in FIG. 7, sample 701 achieved significantly greater material removal rates at a depth of cut of 0.003 inches while having suitable maximum power consumption as compared to the conventional samples 702-703. In fact, the maximum power consumption of sample 701 was less than the maximum power consumption of the conventional sample 703, while the material removal rate was approximately 5× greater. Furthermore, the maximum power consumption of sample 701 was slightly greater than the maximum power consumption of the conventional sample 702, but the sample 701 achieved a material removal rate of more than 12× the material removal rate of the conventional sample 702. Such results show a significant improvement in the grinding efficiency and grinding capabilities of the bonded abrasive articles formed according to the embodiments herein over state-of-the-art conventional bonded abrasive articles.

Example 5

A comparative grinding test is conducted to compare the corner holding ability of a bonded abrasive article of the embodiments herein to conventional bonded abrasive articles during high-speed grinding operations. FIGS. 8-11 provide plots and figures of the result of the test.

Figure 8:
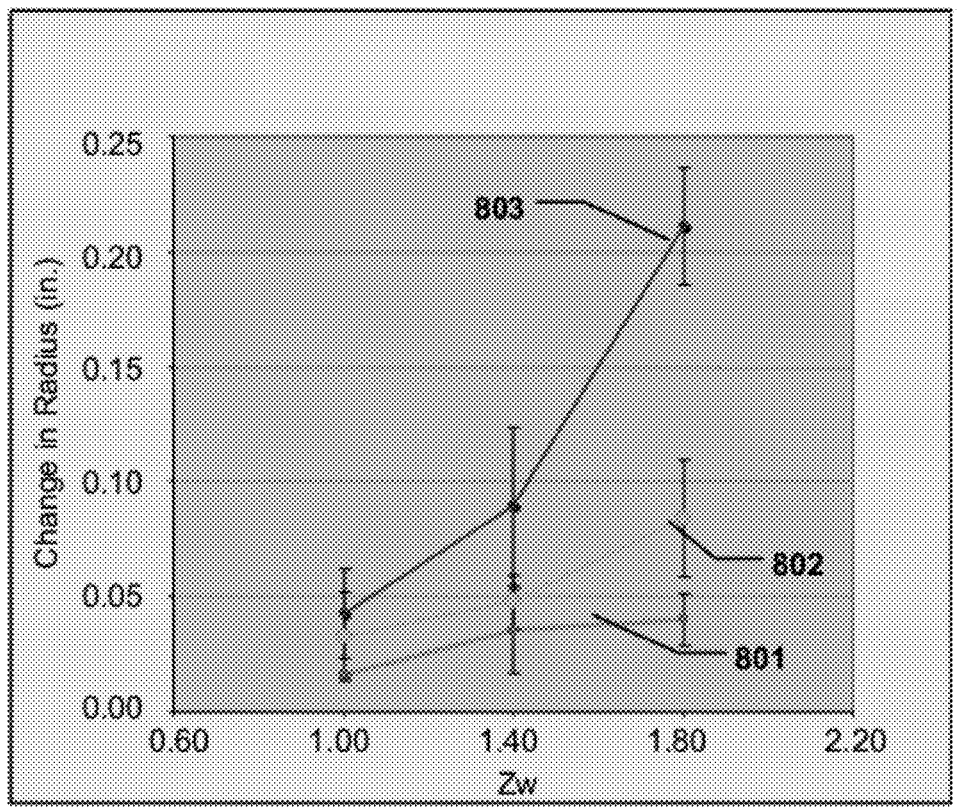
FIG. 8 includes a plot of change in radius versus depth of cut (Zw) demonstrating a corner holding factor for conventional bonded abrasive articles and a bonded abrasive article according to an embodiment.

FIG. 8 includes a plot of change in radius versus depth of cut (Zw) demonstrating a corner holding factor, for two conventional bonded abrasive articles and a bonded abrasive article according to an embodiment. The corner holding factor is a measure of change in radius for a given depth of cut, and generally is an indication of the ability of the bonded abrasive article to maintain its shape under severe grinding conditions of high-speed grinding operations. The change in radius of each sample was measured at three different depth of cut values (i.e., 1.00, 1.40, and 1.80) as illustrated by the plots of FIG. 8. The parameters of the test are provided in Table 4 below.

TABLE 4

Test Conditions

| Test Date: | | | |
|---|---|---|---|
| Machine: | Bryant | | |
| Coolant: | E 812 | | |
| Wheel Speed [rpm]: | 5400 | | |
| Wheel Speed [sfpm]: | 9915 (Constant) | | |
| Dress Type: | Dress Type | | Rotory |
| Dress Comp [in]: | .015" Radius .015" Face | | |
| Dress Lead [in/sec]: | 0.0020 | | |
| Dresser Speed [rpm]: | 3787 | | |
| Test: | | | |
| Material: | 4330V | Work Speed [rpm]: | 232 |
| Lot #: | 287 | Sparkout [s]: | 0.2 |
| Hardness: | 28-32 RC | | |
| Part Width [in]: | 0.35 | Apprx. Whl OD [in]: | 7.000 |
| Grind Width [in]: | 0.10 | Apprx. Wrk OD [in]: | 3.745 |
| Fn (lbs/V): | 30.00 | Full Scale [V]: | 10.0 |

TABLE 4-continued

Test Conditions

| Ft (lbs/V): | 30.00 | Full Scale [V]: | 10.0 |
|---|---|---|---|
| Power [hp/V]: | 2.14 | Full Scale [V]: | 10.0 |

Plot 801 represents a sample of the bonded abrasive articles formed according to the embodiments herein. Sample 801 has a range of porosity of approximately 40 vol % to approximately 43 vol %, a range of abrasive particle content (i.e., microcrystalline alumina particles) within a range between about 46 vol % and about 50 vol %, and a range of bond material content within a range between about 9 vol % and about 11 vol %. The composition of the bond of sample 801 was the same as noted above in Table 1.

Samples 802 and 803 represent conventional bonded abrasive articles suitable for high-speed grinding applications. The conventional samples 802 and 803 represent conventional bonded abrasive articles available as VS and VH Products, respectively. The VS and VH Products are commercially available from Saint-Gobain Corporation.

As illustrated in FIG. 8, sample 801 has a significantly improved corner holding factor, which is measured by the total change in radius (inches) at a particular depth of cut. In particular, plot 801 demonstrated a corner holding factor (i.e., total change in radius) of less than 0.05 inches for all of the depth of cut values. Moreover, the corner holding factor of the sample 801 was measurably better than the corner holding factor of any of the other high-speed conventional bonded abrasive articles (i.e., samples 802 and 803). In fact, at a depth of cut of 1.40, sample 801 demonstrated a corner holding factor that was over 2× less than conventional sample 803, thus having a change in radius that was less than half of the change in radius of sample 803. Moreover, at a depth of cut of 1.80, sample 801 demonstrated a corner holding factor that was approximately 2× less than the corner holding factor of the conventional sample 802 and over 6× less than the corner holding factor of the conventional sample 803. Such results show a remarkable improvement in the corner holding factor, robustness, and resistance to deformation of the bonded abrasive articles of the embodiments herein as compared to conventional high-speed bonded abrasive articles.

Figure 9:
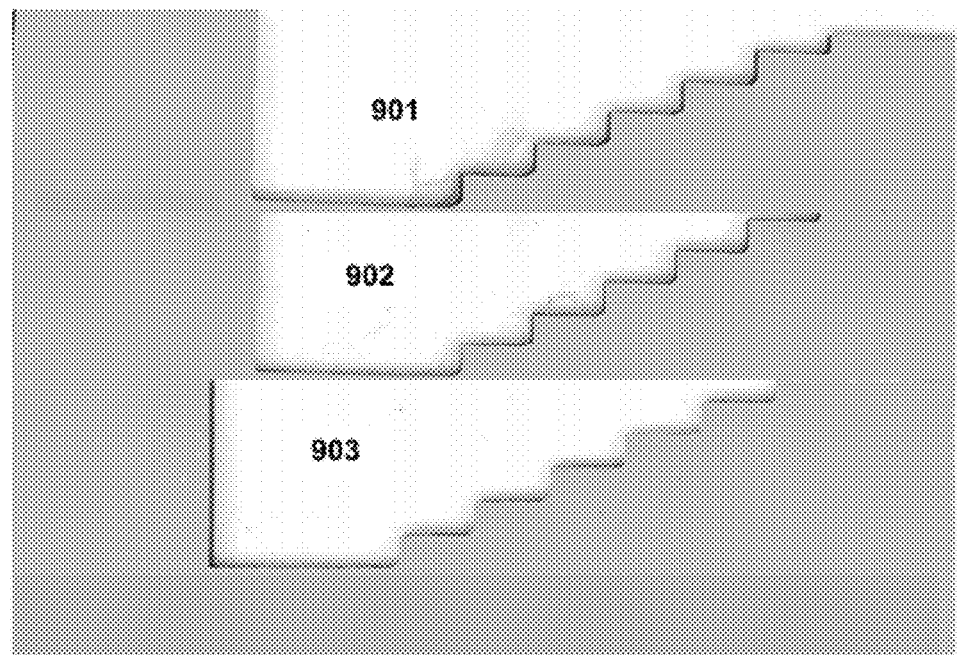
FIG. 9 includes a series of photographs illustrating corner holding factor for conventional bonded abrasive articles and a bonded abrasive article according to an embodiment.
Figure 10:
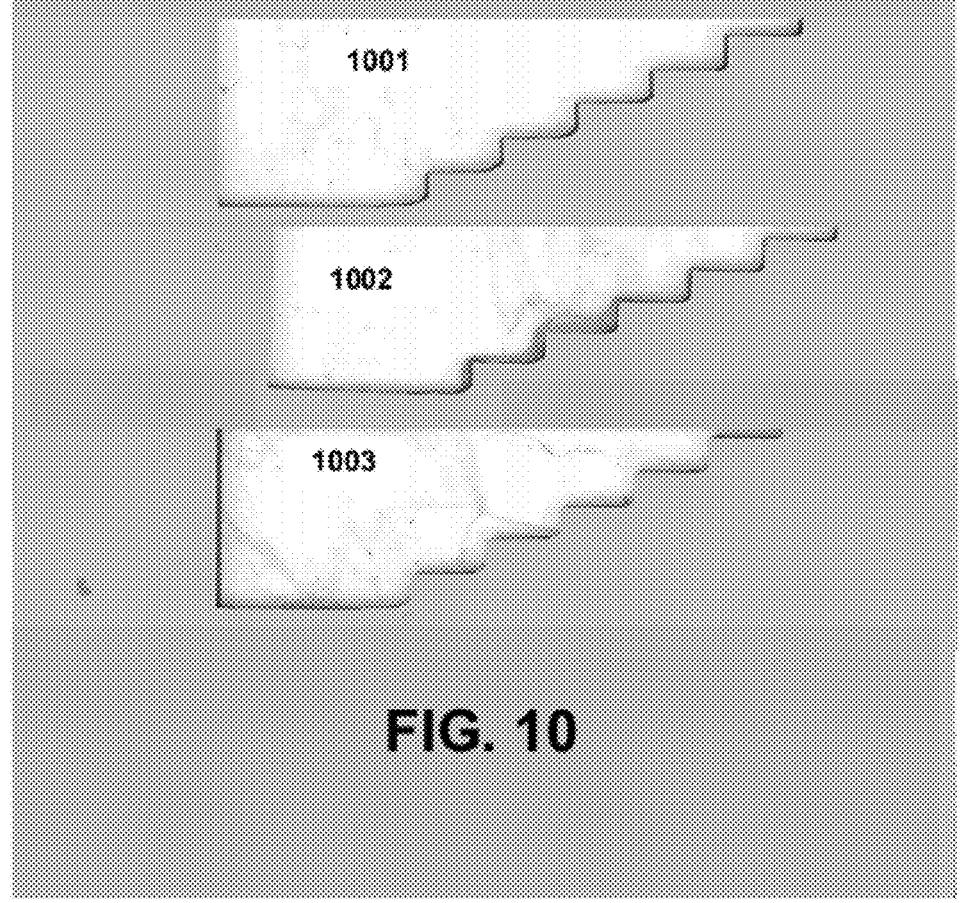
FIG. 10 includes a series of photographs illustrating corner holding factor for conventional bonded abrasive articles as compared to a bonded abrasive article according to an embodiment.
Figure 11:
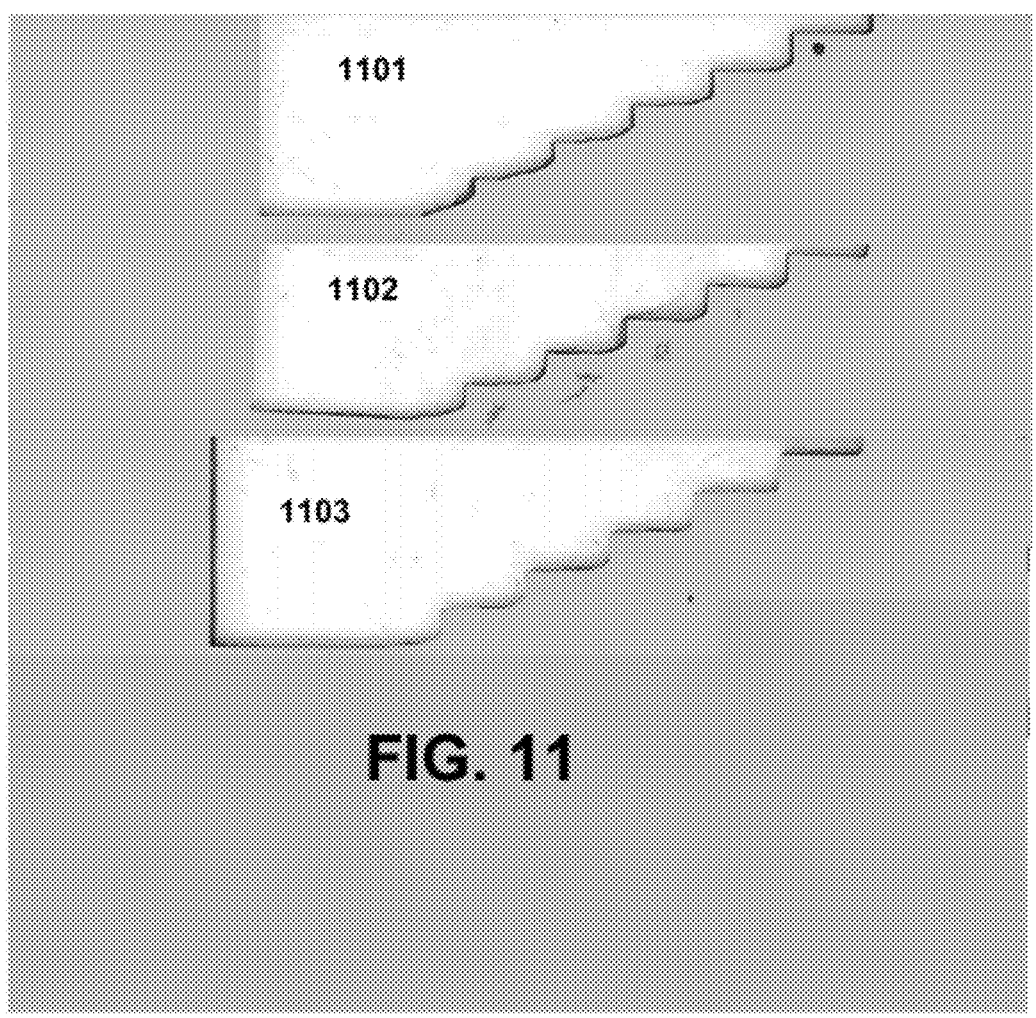
FIG. 11 includes a series of photographs illustrating corner holding factor for conventional bonded abrasive articles as compared to a bonded abrasive article according to an embodiment.

FIGS. 9-11 include a series of illustrations providing pictures of the corner holding ability of a bonded abrasive article according to an embodiment versus two conventional high-speed bonded abrasive articles. Notably, FIGS. 9-11 provide further evidence of the improved corner holding ability and robustness of the abrasive articles of the embodiments herein as compared to conventional bonded abrasive articles.

FIG. 9 includes a series of photographs illustrating corner holding factor for conventional bonded abrasive articles as compared to a bonded abrasive article according to an embodiment. Sample 901 is a workpiece of 4330V alloy steel that was ground by a conventional bonded abrasive article commercially available as a VH bonded abrasive wheel from Saint-Gobain Corporation. Sample 902 represents a workpiece ground by a conventional bonded abrasive article commercially available as a VS bonded abrasive wheel from Saint-Gobain Corporation. Sample 903 represents a workpiece ground by a bonded abrasive article according to an embodiment having the same structure as sample 501 noted above. For all of the samples above, grinding of the workpieces is conducted under the conditions provided in Table 4.

As pictured in FIG. 9, sample 903 is capable of grinding the workpiece to have the most uniform edges as compared to samples 901 and 902. The images support the grinding data demonstrated by the previous tests.

FIG. 10 includes a series of photographs illustrating corner holding factor for conventional bonded abrasive articles as compared to a bonded abrasive article according to an embodiment. Sample 1001 is a workpiece of 4330V alloy steel that was ground under the conditions noted in Table 6 below, by a conventional bonded abrasive article commercially available as a VH bonded abrasive wheel from Saint-Gobain Corporation. Sample 1002 represents a workpiece ground by a conventional bonded abrasive article commercially available as a VS bonded abrasive wheel from Saint-Gobain Corporation. Sample 1003 represents a workpiece ground by a bonded abrasive article according to an embodiment having the same structure as sample 501. For all samples above, grinding of the workpieces is conducted under the conditions provided in Table 4.

As pictured in FIG. 10, sample 1003 demonstrates the most uniform edges as compared to samples 1001 and 1002. In fact, the corners of the sample 1001 are significantly worse than the edges of sample 1003, demonstrating the limited ability of the conventional bonded abrasive article to properly form the edges under the grinding conditions noted in Table 4. Likewise, the corners of the sample 1002 are noticeably worse than the edges of sample 1003, demonstrating the limited ability of the conventional bonded abrasive article to properly form the edges under the grinding conditions noted in Table 4 as compared to the bonded abrasive article used to form the sample 1003. The images of FIG. 10 support the superior grinding data generated in the previous examples.

FIG. 11 includes a series of photographs illustrating corner holding factor for conventional bonded abrasive articles as compared to a bonded abrasive article according to an embodiment. Sample 1101 is a workpiece of 4330V alloy steel that was ground under the conditions noted in Table 4, by a conventional bonded abrasive article commercially available as a VH bonded abrasive wheel from Saint-Gobain Corporation. Sample 1102 represents a workpiece ground by a conventional bonded abrasive article commercially available as a VS bonded abrasive wheel from Saint-Gobain Corporation. Sample 1103 represents a workpiece ground by a bonded abrasive article according to an embodiment having the same structure as sample 501 noted above. For all samples above, grinding of the workpieces is conducted under the conditions provided in Table 4.

As pictured in FIG. 11, sample 1103 demonstrates the most uniform and well-defined edges as compared to samples 1101 and 1102. In fact, the corners of the sample 1101 are significantly worse than the edges of sample 1103, demonstrating the limited ability of the conventional bonded abrasive article to properly form the edges under the grinding conditions noted in Table 4. Likewise, the corners of the sample 1102 are noticeably worse than the edges of sample 1103, demonstrating the limited ability of the conventional bonded abrasive article to properly form the edges under the grinding conditions noted in Table 4, particularly when compared to the edges of sample 1103. The images of FIG. 11 support the superior grinding data generated in the previous examples.

The foregoing embodiments are directed to abrasive products, and particularly bonded abrasive products, which represent a departure from the state-of-the-art. The bonded abrasive products of the embodiments herein utilize a combination of features that facilitate improved grinding performance. As described in the present application, the bonded abrasive bodies of the embodiments herein utilize a particular amount and type of abrasive particles, particular amount and type of bond material, and have a particular amount of porosity. In addition to the discovery that such products could be formed effectively, despite being outside of the known realm of conventional abrasive products in terms of their grade and structure, it was also discovered that such products demonstrated improved grinding performance. Notably, it was discovered that the bonded abrasives of the present embodiments are capable of operating at higher speeds during grinding operations despite having significantly higher porosity than conventional high-speed grinding wheels. In fact, quite surprisingly, the bonded abrasive bodies of the embodiments herein demonstrated a capability of operating at wheel speeds in excess of 60 m/s, while also demonstrating improved material removal rates, improved corner holding ability, and suitable surface finish as compared to state-of-the-art high speed grinding wheels.

Moreover, it was discovered that the bonded abrasives of the present embodiments are capable of having marked differences in certain mechanical characteristics versus state-of-the-art conventional wheels. The bonded abrasive bodies of the present embodiments have demonstrated a significant difference in the relationship of MOR and MOE, facilitating improved performance in various grinding applications, despite having a significantly greater degree of porosity over conventional high speed wheels. Quite surprisingly, it was discovered that in utilizing the combination of features associated with the bonded abrasive bodies of the embodiments herein, a significantly stiffer (MOR) bonded abrasive body could be achieved for a given MOE, as compared to conventional high speed grinding wheels of similar structure and grade.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article comprising:
   a bonded abrasive body having abrasive particles comprising microcrystalline alumina (MCA) contained within a single phase vitreous bond material comprising not greater than about 20 wt % boron oxide ($B_2O_3$), a total content of alkali oxide compounds ($R_2O$) of at least 14 wt % and not greater than 18 wt %, a ratio of weight percent silica ($SiO_2$): weight percent alumina ($Al_2O_3$) of not greater than about 3.2 (by weight percent), wherein a content of any individual alkali oxide compound in wt % is not greater than one half of a total content of the alkali oxide compounds in wt % within the bond material, wherein the bonded abrasive body has a porosity of at least 51 vol % and not greater than 70 vol % of the total volume of the bonded abrasive body, a bond content of at least about 6 vol % and not greater than about 14 vol % of the total volume of the bonded abrasive body, and wherein the bonded abrasive body is capable of grinding a workpiece comprising metal at a speed of at least about 60 m/s.

2. An abrasive article comprising:

a bonded abrasive body having abrasive particles comprising microcrystalline alumina (MCA) contained within a bond material, wherein the bonded abrasive body has a porosity of at least 51 vol % and not greater than 56 vol % of the total volume of the bonded abrasive body, a bond content of at least about 6 vol % and not greater than about 14 vol % of the total volume of the bonded abrasive body, an abrasive particle content of at least about 42 vol % and not greater than about 52 vol %, a total content of alkali oxide compounds ($R_2O$) of at least 14 wt % and not greater than 18 wt %, wherein a content of any individual alkali oxide compound in wt % is not greater than one half of a total content of the alkali oxide compounds in wt % within the bond material, and wherein the bonded abrasive body capable of grinding a workpiece comprising metal at a speed of at least about 60 m/s, and having a corner holding factor of not greater than about 0.07 inches (1.78 mm) at a depth of cut of 1.8.

3. The abrasive article of claim 1, wherein the abrasive particles consist essentially of microcrystalline alumina.

4. The abrasive article of claim 1, wherein the abrasive particles have an average particle size of not greater than about 250 microns.

5. The abrasive article of claim 1, wherein the microcrystalline alumina comprises grains having an average grain size of not greater than about 1 micron.

6. The abrasive article of claim 1, wherein the bond material comprises a single phase vitreous material.

7. The abrasive article of claim 1, wherein the bonded abrasive body comprises a porosity of not greater than about 60 vol %.

8. The abrasive article of claim 2, wherein the bond material comprises at least about 11 wt % and not greater than about 20 wt % boron oxide ($B_2O_3$) for the total weight of the bond material.

9. The abrasive article of claim 2, wherein the bond material comprises a ratio of weight percent silicon oxide ($SiO_2$): weight percent aluminum oxide ($Al_2O_3$) of not greater than about 3.2.

10. The abrasive article of claim 1, wherein the bond material comprises not greater than about 3.0 wt % phosphorous oxide ($P_2O_5$).

11. The abrasive article of claim 10, wherein the bond material is essentially free of phosphorus oxide ($P_2O_5$).

12. The abrasive article of claim 1, wherein the bonded abrasive body has a content of the abrasive particles of at least about 42 vol % and not greater than about 52 vol % of the total volume of the bonded abrasive body.

13. The abrasive article of claim 1, wherein the bond material has a content of silica ($SiO_2$) of at least at least about 48 wt % and not greater than about 52 wt %.

14. The abrasive article of claim 1, wherein the bond material has a content of alumina ($Al_2O_3$) of at least about 15 wt % and not greater than about 20 wt %.

15. The abrasive article of claim 1, wherein the bond material has a total content of silica ($SiO_2$) and boron oxide ($B_2O_3$) of at least 55 wt %.

16. The abrasive article of claim 1, wherein the bond material consists essentially of a vitreous bond material.

17. The abrasive article of claim 1, wherein the bonded abrasive body has a porosity of at least 52 vol % and not greater than 56 vol %, and a content of the abrasive particles of at least 42 vol % and not greater than 52 vol % of the total volume of the bonded abrasive body; and wherein the bond material has a content of silica ($SiO_2$) of at least at least about 48 wt % and not greater than 52 wt %, a content of alumina ($Al_2O_3$) of at least about 15 wt % and not greater than 20 wt %, and a content of boron oxide ($B_2O_3$) of at least 10 wt % and not greater than 17 wt % for the total weight of the bond material.

* * * * *